US010735280B1

(12) United States Patent
Finch et al.

(10) Patent No.: US 10,735,280 B1
(45) Date of Patent: Aug. 4, 2020

(54) INTEGRATION AND CUSTOMIZATION OF THIRD-PARTY SERVICES WITH REMOTE COMPUTING INFRASTRUCTURE

(71) Applicant: VMware, Inc., Palo Alto, CA (US)

(72) Inventors: Travis Finch, Austin, TX (US); Zohar Schafir Hirshfeld, Campbell, CA (US); Shanqiang Huang, Milpitas, CA (US); Lawrence James McDonough, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 10 days.

(21) Appl. No.: 16/256,509

(22) Filed: Jan. 24, 2019

(51) Int. Cl.
  *G06F 15/177* (2006.01)
  *H04L 12/24* (2006.01)
  *H04L 29/08* (2006.01)

(52) U.S. Cl.
  CPC .......... *H04L 41/5041* (2013.01); *H04L 41/22* (2013.01); *H04L 67/10* (2013.01); *H04L 67/20* (2013.01)

(58) Field of Classification Search
  CPC ..... H04L 41/5041; H04L 41/22; H04L 67/10; H04L 67/20
  See application file for complete search history.

(56) References Cited

U.S. PATENT DOCUMENTS

| | | | |
|---|---|---|---|
| 2011/0265168 A1* | 10/2011 | Lucovsky | H04L 63/0245 726/7 |
| 2012/0030672 A1* | 2/2012 | Zygmuntowicz | G06F 8/60 718/1 |
| 2012/0117626 A1* | 5/2012 | Yates | H04L 9/3213 726/4 |
| 2012/0209947 A1* | 8/2012 | Glaser | G06F 9/5027 709/217 |
| 2016/0315995 A1* | 10/2016 | Hausler | H04L 67/02 |
| 2018/0276053 A1* | 9/2018 | Kesavan | G06F 9/541 |
| 2020/0090135 A1* | 3/2020 | Malcangio | H04L 67/20 |

* cited by examiner

Primary Examiner — Philip B Tran
(74) Attorney, Agent, or Firm — Thomas | Horstemeyer, LLP

(57) ABSTRACT

Various examples are described for the integration and customization of third-party applications and services with computing infrastructure of a data center. One or more computing devices can maintain a remote computing environment for an enterprise that provides at least one remote computing service on behalf of the enterprise. The one or more computing devices can identify existing infrastructure used by the remote computing environment in providing the at least one remote computing service, identify third-party services that are compatible with the existing infrastructure, present the third-party services in a console in association with operation of the remote computing environment, and in an instance in which one of the third-party services is selected for deployment in the console, automatically reconfigure the remote computing environment to include the one of the third-party services selected.

20 Claims, 13 Drawing Sheets

Cloud Marketplace 138

Home | My Solutions | Deployments

🔍 Search Cloud Marketplace     162     Show All Solutions ▼

| 110a Advanced Firewall Manager Version: 12.x Publisher: AlphaCo Networks Updated: Aug. 6, 2019 | 110b Data Protection Service Version: 14 Publisher: AlphaCo Networks Updated: Sept. 2, 2019 | 110c Policy-Enforced Security Service Version: 11.0 Publisher: DeltaCo Inc. Updated: July 4, 2019 |

| 110d IT Infrastructure Discovery Version: 12.x Publisher: BetaCo Networks Updated: Nov. 1, 2019 | 110e Linux-Apache-mySQL-PHP (LAMP) Services Version: 2.x Publisher: AlphaCo Networks Updated: Dec. 6, 2019 | 110f Backup and Recovery Service Version: 8.x Publisher: EnterpriseCo Systems Updated: Feb. 16, 2019 |

| 110g Apache Distributed Database Management System Version: 7.2 Publisher: DeltaCo Inc. Updated: Aug. 27, 2019 | 110n DevOps Lifecycle Management Service Version: 1.0 Publisher: EnterpriseCo Systems Updated: Jun. 2, 2019 |

Cloud Marketplace 138

Home    My Solutions    Deployments

Policy-

This servi‌
require ad
complexit‌
security c‌

SUMMARY

Descripti‌

DeltaCo ‌

| Deploy | SDDC | | | 194 |
|---|---|---|---|---|
| 1. SDDC | Select the software-driven data center (SDDC) in VMC on which you would like to deploy this solution to. | | | |
| 2. DeltaCo Cloud Creation Template | | Name | SDDC ID | Organization ID |
| | ● | vmc-sddc-one | a89f4a9ferfkdjfioad fadmfka2891 | zfdaf8djiafdas12 |
| 3. Configuration | | | | |
| 4. Summary | ○ | vmc-sddc-two | afda45f6da6f1da2f 1d6afcafdasf | zfdaf8djiafdas12 |
| 5. Results | | | | 1-2 of 2 sddcs |

Enter SDDC user name and password
Username _____ /–195
Password •••••••• _____ /–196
If required, pass these same credentials to the 3rd party solution for configuration.

DISMISS   BACK   NEXT

Malware prevention and file integrity monitoring are managed through a single connected dashboard, that provides you with full visibility in your cloud environment.

Cloud Marketplace 138

Home    My Solutions    Deployments

Policy-        Deploy              Configuration                                              194

This servi$        1. SDDC             vSphere Resources
require ad
complexit$        2. DeltaCo           Logical Network    network1
security c$        Cloud Creation
                   Template            Resource Pool      Compute Resource Pool
SUMMARY
                   3. Configuration    Folder             myFolder1

4. Summary          Networking Properties

5. Results          IPv4 Address and Mask/Prefix
                                       IPv6 Address and Prefix
                                       IPv4 Default Gateway
                                       IPv64 Default Gateway
                                       DNS Server(s)
                                       Additional DNS Search Domains
                                       Hostname FQDN
Descripti                              NTIP Server(s)

DeltaCo                                            DISMISS | BACK | NEXT

Malware prevention and file integrity monitoring are managed through a single connected dashboard, that provides
you with full visibility in your cloud environment.
                                                                                            ↘
                                                                                            160

*FIG. 7*

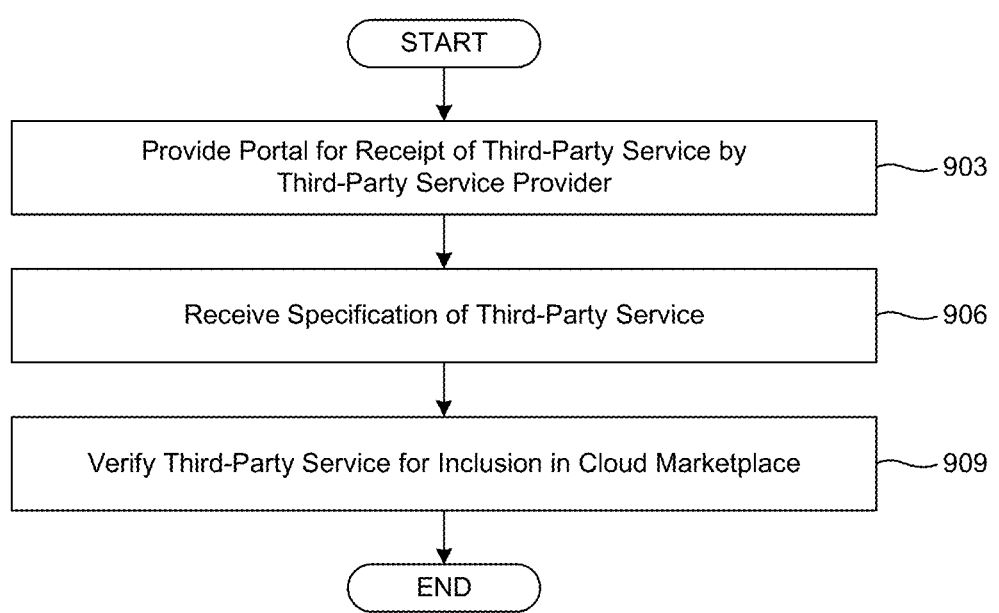
FIG. 11

US 10,735,280 B1

INTEGRATION AND CUSTOMIZATION OF THIRD-PARTY SERVICES WITH REMOTE COMPUTING INFRASTRUCTURE

BACKGROUND

Data centers include various physical and virtual components that, when executed, provide web services, cloud computing environments, virtualization environments, as well as other computing systems. Data centers can include hardware and software to provide computer virtualization services, which relate to the creation of a virtualized version of a physical device, such as a server, a storage device, a central processing unit (CPU), a graphics processing unit (GPU), or other computing resources.

Data centers can also include virtual machines (VMs), which include emulations of a computer system that can be customized to include a predefined amount of random access memory (RAM), hard drive storage space, as well as other computing resources that emulate a physical machine. Operating a data center can involve maintaining hundreds to thousands of CPUs, GPUs, and other physical hardware, as well as corresponding software. Some virtualization platforms include a console that permits administrators to maintain virtualization services. However, adding new virtualization services or integrating existing virtualization services with third-party applications and services remains problematic and is complicated, even for trained information technology (IT) professionals.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2-7 include user interfaces for selecting and configuring a third-party service to implement in association with the networked computing environment of FIG. 1.

FIG. 11 is a flowchart illustrating functionality implemented by components of the networked computing environment of FIG. 1.

DETAILED DESCRIPTION

Figure 1:
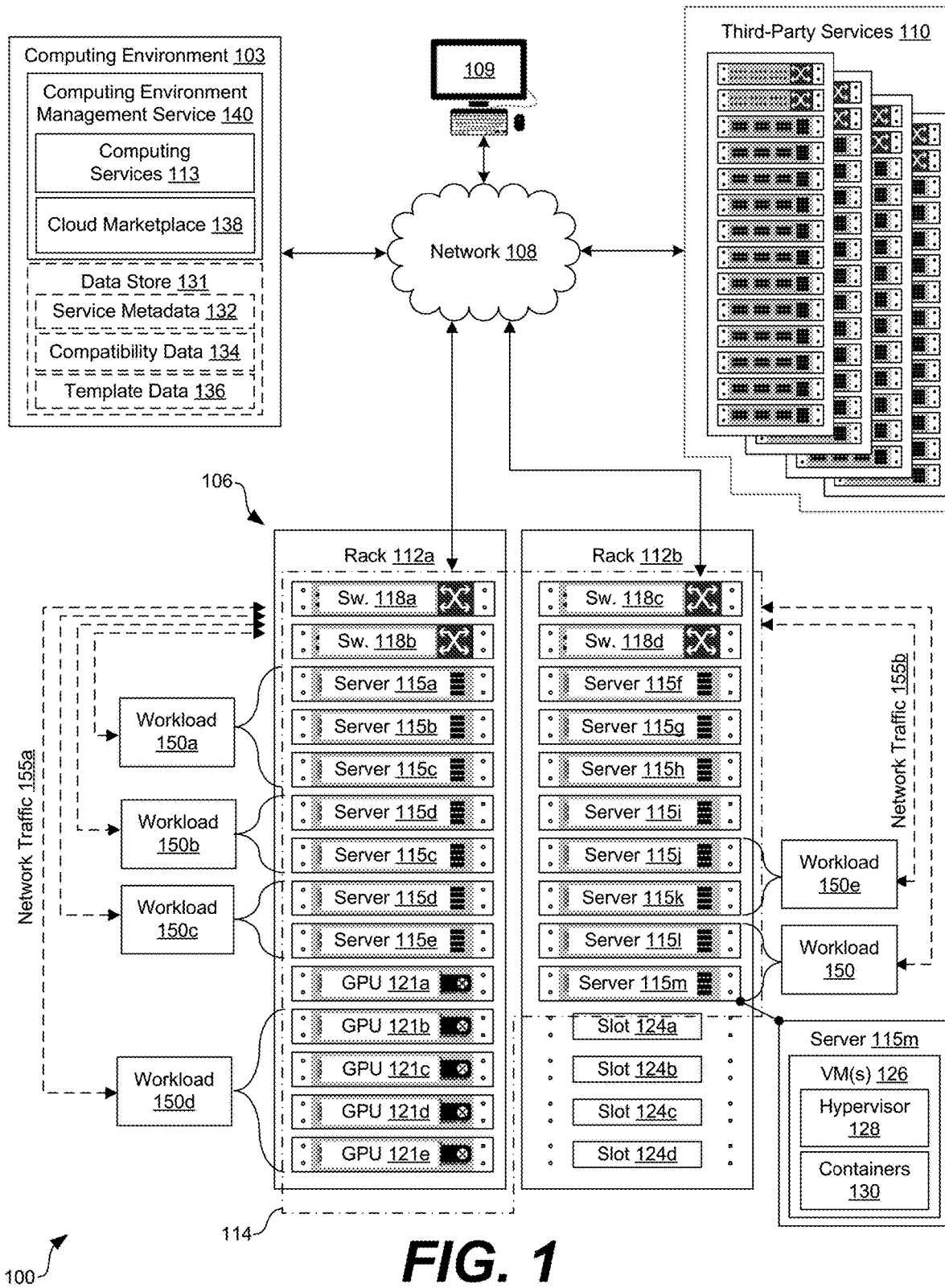
FIG. 1 is a drawing of an example of a networked computing environment having a cloud marketplace for selection of third-party services that interact with infrastructure of the networked computing environment.

The present disclosure relates to the integration and customization of third-party applications and services with computing infrastructure of a data center. Enterprises and other organizations routinely create complex networking services that require components to be deployed on different cloud environments, where the different cloud environments are sometimes offered by different service providers. Creating deployments requiring different service providers can be very complex and time-consuming, even for IT professionals. For instance, creating virtualization and other services that utilize different service providers can require expertise in different cloud platforms. This often deters customers from utilizing third-party services although sometimes they can result in improvement in network security and efficiency in usage of computing resources.

Accordingly, in various examples described herein, a cloud marketplace is described that includes one or more third-party services that can be selected and integrated with infrastructure used by an enterprise to offer a computing service. As such, a user of a first service provider ("AlphaCo") that uses virtualization services of the first service provider can integrate services offered by other service providers, such as a second service provider ("BetaCo") and a third service provider ("DeltaCo"), and so forth, assuming the services are compatible with one another. Further, the use of the third-party services does not require substantial configuration to integrate the third-party services with a computing service utilized by the enterprise.

In one example, one or more computing devices are configured to maintain a remote computing environment for an enterprise that provides at least one remote computing service on behalf of the enterprise. The remote computing environment can include a remote data center or multiple remote data centers. The remote computing service can include, for example, a web service, a virtualization service, a software-defined data center (SDDC) service, a device management service, or other network-based service as can be appreciated.

The one or more computing devices can identify existing infrastructure used by the remote computing environment in providing the remote computing service. The existing infrastructure can include, for example, hardware or software located in one or more data centers that are utilized in providing the remote computing service. Further, the one or more computing devices can identify third-party services that are compatible with the existing infrastructure and present the third-party services in an administrator console in association with operation of the remote computing environment. In an instance in which one of the third-party services is selected for deployment, the one or more computing devices can automatically reconfigure the remote computing environment to include the one of the third-party services selected. In some examples, an ingestion process is performed to receive configuration data from an administrator to assist with the automatic reconfiguration of the computing environment.

Turning now to FIG. 1, an example of a networked environment 100 is shown. The networked environment 100 can include a computing environment 103 and various computing systems 106 in communication with one other over a network 108. The network 108 can include, for example, the Internet, intranets, extranets, wide area networks (WANs), local area networks (LANs), wired networks, wireless networks, other suitable networks, or any combination of two or more such networks. The networked environment 100 can further include third-party services 110, such as network-based services offered by third-party service providers.

The networks of the networked environment 100 can include satellite networks, cable networks, Ethernet networks, telephony networks, and other types of networks. The computing systems 106 can include devices installed in racks 112 which can make up a server bank, aggregate computing system, or a computer bank in a data center or other like facility. In some examples, the computing systems 106 can include high-availability computing systems. A high-availability computing system is a group of computing devices that acts as a single system and provides a continuous uptime. The devices in the computing systems 106 can include any number of physical machines, virtual machines, virtual appliances, and software, such as operating systems, drivers, hypervisors, scripts, and applications.

The computing systems 106 and the various hardware and software components contained therein can include infrastructure of the networked environment 100 that can provide one or more computing services 113. Computing services 113 can include virtualization services in some examples. For instance, the computing services 113 can include those that serve up virtual desktops to end users. Thus, the computing environment 103 can also be described as a virtual desktop infrastructure (VDI) environment in some examples. In other examples, the computing services 113 can include those that provide a public cloud computing environment, a private cloud computing environment, or a hybrid cloud computing environment (a combination of a public and private cloud computing environment). As such, the computing environment 103 can be referred to as a cloud computing environment in some examples. Further, the computing services 113 can include those that provide data to one or more on-premise devices, which can include computing devices physically located in a premises of an enterprise and communicating over an enterprise network having traffic diverted through a firewall.

In various examples, the computing environment 103 can include an enterprise computing environment that includes hundreds or even thousands of physical machines, virtual machines, and other software implemented in devices stored in racks 112, distributed geographically, and connected to one another through the network 108. It is understood that any virtual machine or virtual appliance is implemented using at least one physical device, such as a server or other computing device.

The devices in the racks 112 can include various computing resources 114. The computing resources 114 can include, for example, physical computing hardware, such as memory and storage devices, servers 115a . . . 115m, switches 118a . . . 118d, graphics cards (having one or more GPUs 121a . . . 121e installed thereon), central processing units (CPUs), power supplies, and similar devices. The devices, such as servers 115 and switches 118, can have dimensions suitable for quick installation in slots 124a . . . 124d on the racks 112. In various examples, the servers 115 can include requisite physical hardware and software to create and manage virtualization infrastructure or a cloud computing environment. Also, in some examples, the computing resources 114 can also include virtual computing resources, such as virtual machines or other software.

The servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112. Additionally, if a server 115 includes an instance of a virtual machine, the server 115 can be referred to as a "host," while the virtual machine can be referred to as a "guest."

Each server 115, such as representative server 115m, can act as a host in the networked environment 100, and thereby can include one or more virtual machines 126 as well as a hypervisor 128. In some examples, the hypervisor can be installed on a server 115 to support a virtual machine execution space within which one or more virtual machines 126 can be concurrently instantiated and executed. Additionally, the hypervisor can include the ESX™ hypervisor by VMware®, the ESXi™ hypervisor by VMware®, or similar hypervisor, in some examples. It is understood that the computing systems 106 can be scalable, meaning that the computing systems 106 in the networked environment 100 can increase or decrease dynamically to include or remove servers 115, switches 118, GPUs 121, power sources, and other components, without degrading performance of a virtualization or cloud computing environment.

In various examples, one or more computing services 113 can be provided through execution of an application or service on one or more of the virtual machines 126. The computing services 113 can include, for example, web services in some examples that can be invoked by submitting requests over the network 108 for particular actions to be performed or for particular data to be returned. Additionally, in some examples, the computing services 113 can be implemented in computing containers 130 (hereinafter "containers 130"). Each of the containers 130 can include a self-contained execution environment having its own CPU, memory, block input/output (I/O), and network resources which is isolated from other containers 130. In some examples, a single one of the containers 130 can implement a single one of the computing services 113.

The computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. Although shown separately from the computing systems 106, it is understood that in some examples the computing environment 103 can be included as all or a part of the computing systems 106.

The computing environment 103 can include or be operated as one or more virtualized computer instances in some examples. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 and client devices 109 over the network 108, sometimes remotely, the computing environment 103 can be described as a remote computing environment 103 in some examples. Additionally, in various examples, the computing environment 103 can be implemented in servers 115 of a rack 112 and can manage operations of a virtualized or cloud computing environment through interaction with the computing services 113.

The computing environment 103 can include a data store 131. The data store 131 can include memory of the computing environment 103, mass storage resources of the computing environment 103, or any other storage resources on which data can be stored by the computing environment 103. The data store 131 can include memory of the servers 115 in some examples. For instance, the data store 131 can include one or more relational databases, such as structure query language (SQL) databases, non-SQL databases, or other relational or non-relational databases. The data stored in the data store 131, for example, can be associated with the operation of the various services or functional entities described below.

The data store 131 can include a database or other memory that includes, for example, service metadata 132, compatibility data 134, template data 136, as well as other data not discussed herein. The service metadata 132 can include information provided by a third-party service provider in association with one of the third-party services 110. For instance, the service metadata 132 can include a name of a third-party service 110, a description of the functionality of the third-party service 110, usage requirements of the third-party service 110, application programming interface (API) calls for use of the third-party service 110, as well as other information. It is understood that the third-party services 110 are different from the computing service 113 of the computing environment 103. As such, the computing environment 103 can maintain the service metadata 132, compatibility data 134, template data 136, and other data, to integrate third-party service 110 with the computing service 113 of the computing environment 103.

In some examples, the computing environment 103 can serve up a portal, such as a developer portal, that allows the third-party service provider to upload or otherwise provide the service metadata 132 to make a third-party service 110 available for use in a cloud marketplace 138, as will be discussed. Additionally, the computing environment 103 can obtain compatibility data 134 as well as template data 136. Compatibility data 134 can include technical requirements of the infrastructure of the computing systems 106 for the third-party service 110 to successfully interact or integrate with the computing services 113 of the computing environment 103.

To successfully integrate a third-party service 110 with one or more of the computing service 113, the portal can receive a specification of template data 136. The template data 136 can include fields, potential values, default values, or other information that can be used by the cloud marketplace 138 to perform an ingestion process, whereby a user of the computing services 113 provides settings or other criteria to integrate one of the third-party services 110 with the computing services 113. For instance, the template data 136 can direct the computing services 113 to obtain server data, internet protocol (IP) data, authentication data, or other information to integrate a third-party service 110 with a computing service 113.

In further examples, the template data 136 can include a uniform resource locator (URL) for a network site maintained by a third-party service provider. For instance, in some examples, an environment of the third-party service provider must be configured to integrate a third-party service 110 with computing services 113 of the computing environment 103. As such, through the template data 136, the third-party service provider can alter a wizard or other process to redirect an administrator to a third-party network site, at least temporarily, to assist in the integration of the third-party service 110 with the computing services 113.

The components executed on the computing environment 103 can include, for example, a computing environment management service 140 as well as other applications, services, processes, systems, engines, or functionality not discussed in detail herein. The computing environment management service 140 can be executed to oversee the operation of the networked environment 100 through management of the computing systems 106 as well as the physical and virtual computing resources that make up the computing systems 106. In some examples, an enterprise, organization, or other entity can operate the computing environment management service 140 to oversee or manage the operation of devices in the racks 112, such as servers 115, switches 118, GPUs 121, power supplies, cooling systems, and other components.

The computing environment management service 140 can include an administrator portal that allows administrators of various enterprises to configure computing services 113. For example, in an instance in which an enterprise uses the computing environment management service 140 to provide virtual desktops to employees of the enterprise, the computing environment management service 140 can serve up an administrator portal that allows an administrator to define a number of virtual desktops available to client devices 109, or allocate computing resources 114 to the virtual desktops.

The various physical and virtual components of the computing systems 106 can process workloads 150a . . . 150f. Workloads 150 can refer to the amount of processing that a server 115, switch 118, GPU 121, or other physical or virtual component has been instructed to process or route at a given time. The workloads 150 can be associated with virtual machines 126, public cloud services, private cloud services, hybrid cloud services, virtualization services, device management services, or other software executing on the servers 115. For instance, the workloads 150 can include tasks to be processed to provide employees of an enterprise with remote desktop sessions or other virtualized computing sessions.

The computing environment management service 140 can maintain a listing of active or inactive workloads 150 as well as oversee the assignment of various workloads 150 to various devices in the computing systems 106. For instance, the computing environment management service 140 can assign a workload 150 lacking in available resources to a server 115 that has resources sufficient to handle the workload 150. The workloads 150 can be routed to various servers 115 by the switches 118 as network traffic 155a . . . 155b.

Referring now to FIG. 2, an example of a user interface 160 of the cloud marketplace 138 is shown. In some examples, an administrator can access an administrator console to oversee operation of the computing services 113. For instance, the administrator can access an administrator console to specify settings, troubleshoot, analyze traffic, and plan security in association with a cloud computing environment offered provided through the computing services 113. In some instances, it can be beneficial for the administrator to employ a third-party service 110, which can provide functionality not offered by the computing services 113 or can be better suited for performing various functions. As such, at least a portion of the administrator console can include the cloud marketplace 138.

The cloud marketplace 138 can include a listing of various third-party services 110a . . . 110n. It is understood that the third-party services 110 include computing services separate from the computing services 113 of the computing environment 103. It is also understood that the third-party services 110 include those that are able to integrate with or otherwise interact with the computing services 113 of the computing environment 103. Using a search field 162, the administrator or other user can execute a search query to identify relevant ones of the third-party services 110. As such, the cloud marketplace 138 has functionality similar to an application store.

In some examples, the cloud marketplace 138 includes only third-party services 110 that are able to interact with computing services 113 used by the administrator. For instance, if the computing services 113 include virtualization services used by the administrator, the cloud marketplace 138 only includes third-party service 110 that are able to interact or integrate with virtualization services. Alternatively, if the computing services 113 include cloud computing services used by the administrator, the cloud marketplace 138 would only include third-party services 110 that are able to interact or integrate with cloud computing services.

To display only third-party services 110 able to interact or integrate with the computing services 113 used by an administrator, enterprise, or other entity, the computing environment 103 can identify existing infrastructure used in providing the computing services 113. Additionally, the computing environment 103 can identify one or more of the third-party services 110 that are compatible with the existing infrastructure based on an analysis of the service metadata 132 and compatibility data 134. It is understood that, in some examples, only compatible third-party services 110 are shown in the cloud marketplace 138.

As shown in FIG. 2, in some examples, the third-party services 110 can include traffic management services, firewall management service, domain name system (DNS) services, web application firewall services, and access policy manager services. Additionally, in some examples, the third-party services can include data protection services, policy-enforcement security services, backup and recovery services, IT infrastructure discovery services, development operations ("DevOps") lifecycle management services, distributed database management services, as well as other services. The administrator or other user can select or otherwise manipulate one of the third-party services 110 to begin a process in which the selected one of the third-party services 110 is integrated with the computing services 113.

Figure 3:
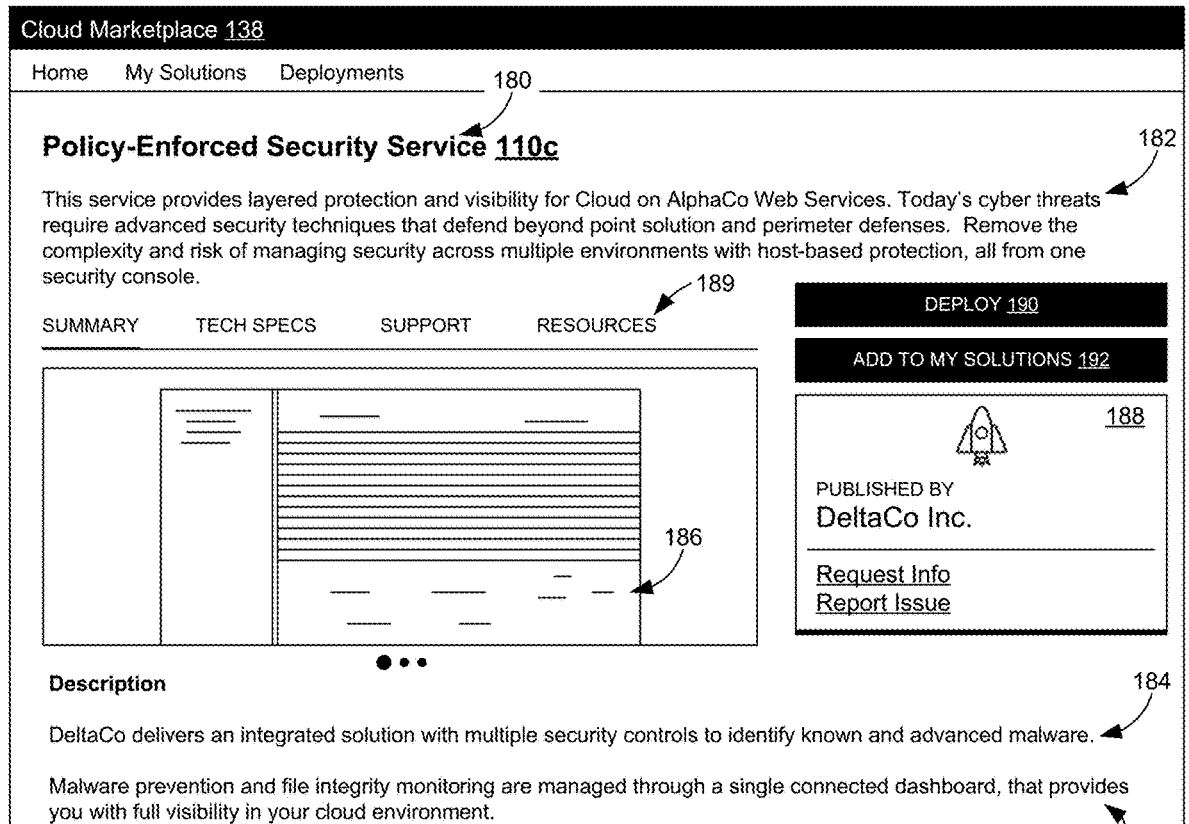

Moving on to FIG. 3, another example of a user interface 160 of the cloud marketplace 138 is shown. Specifically, the user interface 160 includes an example in which the third-party service 110c of FIG. 2 has been selected that pertains to a "Policy-Enforce Security Service." As such, the user interface 160 for a selected one of the third-party services 110 can include various information associated therewith, such as a title 180, short description 182, long description 184, screen shot 186, publication information 188, as well as other information that can be obtained from the service metadata 132. A navigation bar 189 permits the administrator to navigate between a summary, technical specifications, support documents, and other resources that pertain to the third-party service 110.

Further, the user interface 160 can include a deploy component 190 and an "add to my solutions" component 192. The administrator can select or manipulate the deploy component 190 to start a process in which the third-party service 110 is integrated with one or more computing services 113 used or existing in the computing environment 103. The administrator can select or manipulate the "add to my solutions" component 192 to save the third-party service 110 to a list, for instance, to configure or deploy the third-party service 110 at a later time.

Referring next to FIG. 4, another example of a user interface 160 of the cloud marketplace 138 is shown. The user interface 160 includes an ingestion dialog 194 that performs an ingestion process, for instance, when the deploy component 190 has been selected in the user interface 160 of FIG. 3. The ingestion process can include a wizard or, in other words, a series of user interfaces 160 that receive settings and other configurations for deploying the third-party service 110 automatically.

In some examples, at least a portion of the ingestion process is generated based on template data 136 corresponding to a third-party service 110. As such, a third-party service provider, through the template data 136, is able to define or customize the work flow such that the third-party service 110 can be integrated properly with the computing services 113. In some examples, the template data 136 includes an extensible markup language (XML) document that defines fields, default values, validation rules, or other data that is useful in generating one or more dialogs of the ingestion process.

In some examples, the ingestion process includes a first dialog for selection of infrastructure with which the third-party service 110 should be integrated, a second dialog for specifying settings required by the third-party service provider in deploying the third-party service 110, a third dialog for configuration of the third-party service 110 with respect to the computing services 113, a fourth dialog for displaying a summary of the deployment, and a fifth dialog for displaying results of the deployment. In other examples, however, the cloud marketplace 138 can include a greater or lesser number of dialogs or other user interface components to obtain requisite information.

Notably, in FIG. 4, an example of a first dialog is shown for selecting infrastructure with which the third-party service 110 should be integrated. In some examples, infrastructure of the computing systems 106 can be defined a software-driven data center. As such, the ingestion dialog 194 can include a listing of SDDCs, where one of the SDDCs can be selected or otherwise manipulated. As can be appreciated, the selected one of the SDDCs includes corresponding infrastructure of the data center that provides one or more of the computing services 113 with which the third-party service 110 will be integrated. To assist with identifying one of the SDDCs, the computing environment 103 can generate the ingestion dialog 194 to include a unique identifier associated with a SDDC (a "SDDC ID") as well as a unique identifier for an organization.

In some examples, the ingestion process can require the administrator to provide authentication credentials to proceed with a deployment of a third-party service 110. As such, the ingestion dialog 194 can include one or more authentication fields 195 for receiving a username, password, personal identifier number (PIN), email address, security certificate information, or other authentication credentials. Further, the ingestion dialog 194 can include a user interface component 196 that permits the administrator to specify whether the authentication credentials should be passed on to third-party service provider. By passing along the authentication credentials to the third-party service provider, the time required to complete the deployment of the third-party service 110 can be reduced and simplified.

Figure 5:
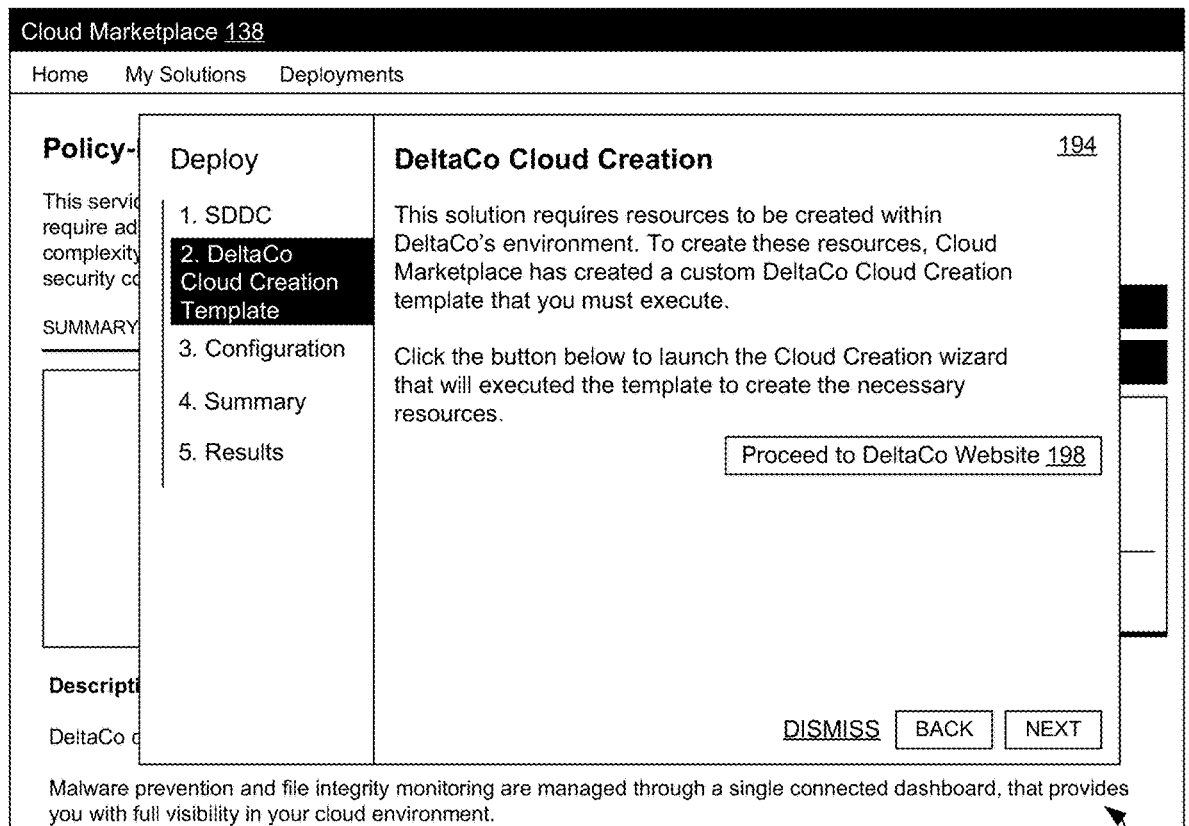

Turning now to FIG. 5, another example of a user interface 160 of the cloud marketplace 138 is shown. More specifically, in FIG. 5, an example of a second dialog of the ingestion process is shown. The user interface 160 indicates that deployment of the third-party service 110 requires resources to be created in an environment managed by the third-party service provider. In other words, the third-party service 110 requires resources to be created in an environment separate from the computing environment 103.

As the computing environment 103 may not have the ability to configure a third-party service 110 outside of its control, the ingestion dialog 194 can include a user interface component 198 that, when selected, directs the user to a network site associated with the third-party service provider. It is understood that, after completion of the configuration on the network site of the third-party service provider, the administrator will be returned to the ingestion dialog 194 to continue deployment of the third-party service 110.

The computing environment 103 can generate the user interface component 198 such that information obtained in the ingestion process or otherwise associated with the computing services 113 is passed on to the network site of the third-party service provider. For instance, the user interface component 198 can redirect the user to a uniform resource locator (URL) having data appended to the URL using keys and key values. Using the data from the URL, the third-party service provider can prepopulate fields, again reducing the time required to complete deployment of the third-party service 110.

Figure 6:

Moving along to FIG. 6, an example of a user interface 160 for a portal 200 of a third-party service provider is shown. For instance, after selecting or otherwise manipulating the user interface component 198 of FIG. 5, the user is redirected to a network site or other screen maintained by the third-party service provider. The fields shown in the user interface 160 can be prepopulated, for instance, by passing data to the third-party service provider received during the ingestion process. While the user interface 160 shown in FIG. 6 includes fields for authentication, it is understood that the portal 200 can generate additional user interfaces 160 for receipt of other configuration settings.

After completion of the configuration on the portal 200 of the third-party service provider, the user can be redirected back to the ingestion process (and the ingestion dialog 194). In some examples, the third-party service provider can invoke a callback that returns data that can be used to prepopulate fields or otherwise facilitate the deployment of the third-party service 110.

Moving along to FIG. 7, another example of a user interface 160 of the cloud marketplace 138 is shown. More specifically, in FIG. 7, an example of a third dialog of the ingestion process is shown. It is understood that the third dialog can be shown after the user has completed configuration on the network site of the third-party service provider.

The user interface 160 can include additional settings for integrating the third-party service 110 with existing infrastructure. For instance, assuming the third-party service 110 is a security-related service, the user interface 160 can receive a specification of a logical network, a resource pool, an installation folder, as well as networking information. The networking information can include, for instance, internet protocol addresses, masks or pre-fixes, default gateways, DNS servers, DNS search domains, fully-qualified domain name (FQDN), network time protocol (NTP) servers, as well as other information.

Figure 8:
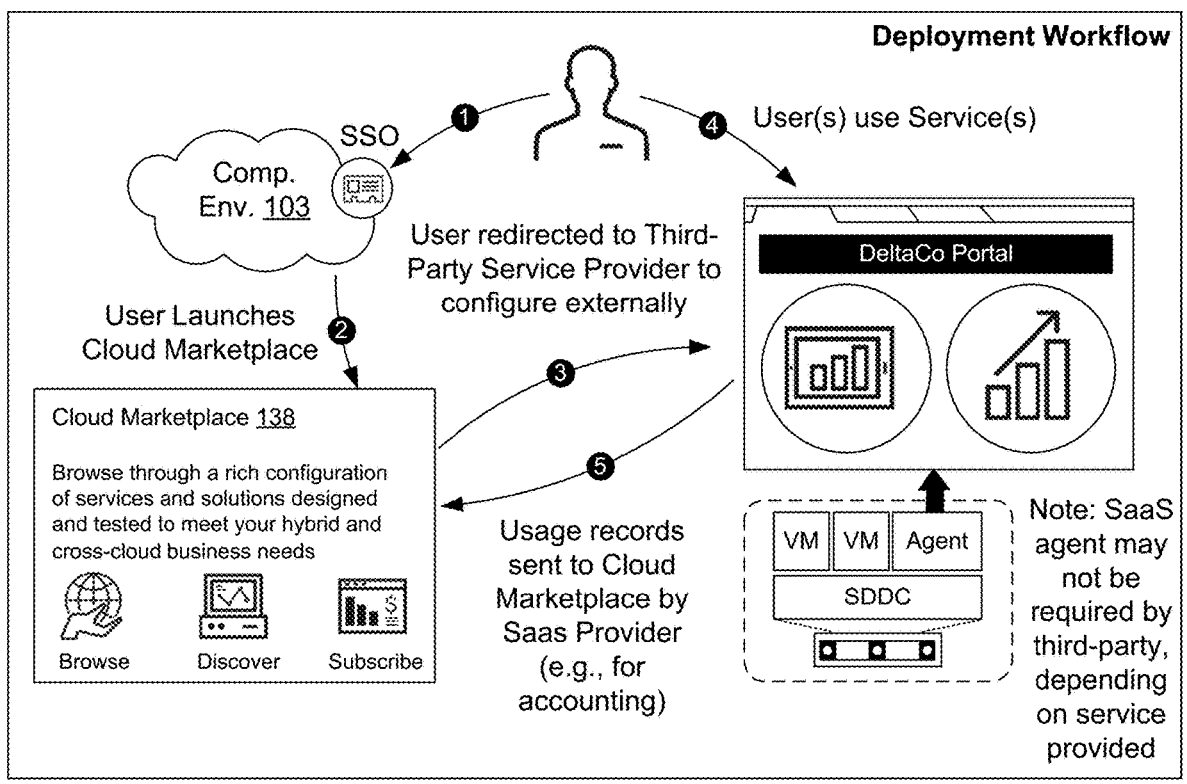
FIG. 8 is a sequence diagram illustrating an example workflow for using the cloud marketplace to deploy a third-party service that interacts with infrastructure of the networked computing environment of FIG. 1.

Referring next to FIG. 8, a sequence diagram 800 is shown according to various examples. The sequence diagram 800 includes an example workflow for a user using the cloud marketplace 138 to select and deploy a third-party service 110. For instance, an administrator or other end user can select one or more third-party services 110 that are configured to interact with the computing services 133 or other infrastructure maintained by the end user. The user can include a network administrator in some examples.

First, the user can authenticate with the computing environment 103, for example, by interacting with a single-sign-on (SSO) service, providing authentication credentials, or otherwise authenticating a client device 109. In some examples, the computing environment 103 includes an administrator portal that permits the user to configure settings associated with one or more computing services 113 provided through the computing environment 103 and the underlying computing systems 106.

Second, through the administrator portal, the user can launch or otherwise access the cloud marketplace 138. The cloud marketplace 138 can include a listing of one or more third-party services 110, as shown in FIG. 2. In some examples, the cloud marketplace 138 only presents third-party services 110 that are compatible with computing services 113 used by the end user. Upon selection of one of the third-party services 110, the computing environment 103 can start an ingestion process to deploy the selected third-party service 110.

Third, during the ingestion process, the user can be redirected to a network site or other user interface 160 associated with the third-party service provider. As can be appreciated, the third-party service provider can include a publisher of the selected third-party service 110. Upon being redirected to the network site, the network site of the third-party service provider can prompt the user to provide authentication credentials or configuration settings to enable the third-party service 110 in an environment separate from the computing environment 103. Thereafter, the user can be returned to the ingestion process in the cloud marketplace 138.

Fourth, the user, or other individuals associated with an enterprise, can use the third-party service 110 and/or the computing services 113 of the computing environment 103. For instance, if the computing services 113 of the computing environment 103 include virtualization services, the user can use a security service (a third-party service 110) to determine whether any security vulnerabilities exist in the virtualization services.

In some examples, deployment of the third-party service 110 includes installing an agent in the computing environment 103. The agent can interact with the third-party service 110, as shown in FIG. 8. Referring to the example above, if the third-party service 110 is a security service, the agent can perform security related functions, such as scanning the computing environment 103 for viruses or detecting other security vulnerabilities. In some instances, an agent may not be required, depending on the type of third-party service 110 deployed.

Fifth, the third-party service 110 can return usage records to the cloud marketplace 138. In some examples, usage records can include a number of instances of use of the third-party service 110. In some examples, the usage records can be used in billing the user for use of the third-party service 110. In other examples, the usage records can be used to further optimize the third-party service 110 and/or the computing services 113.

Figure 9:
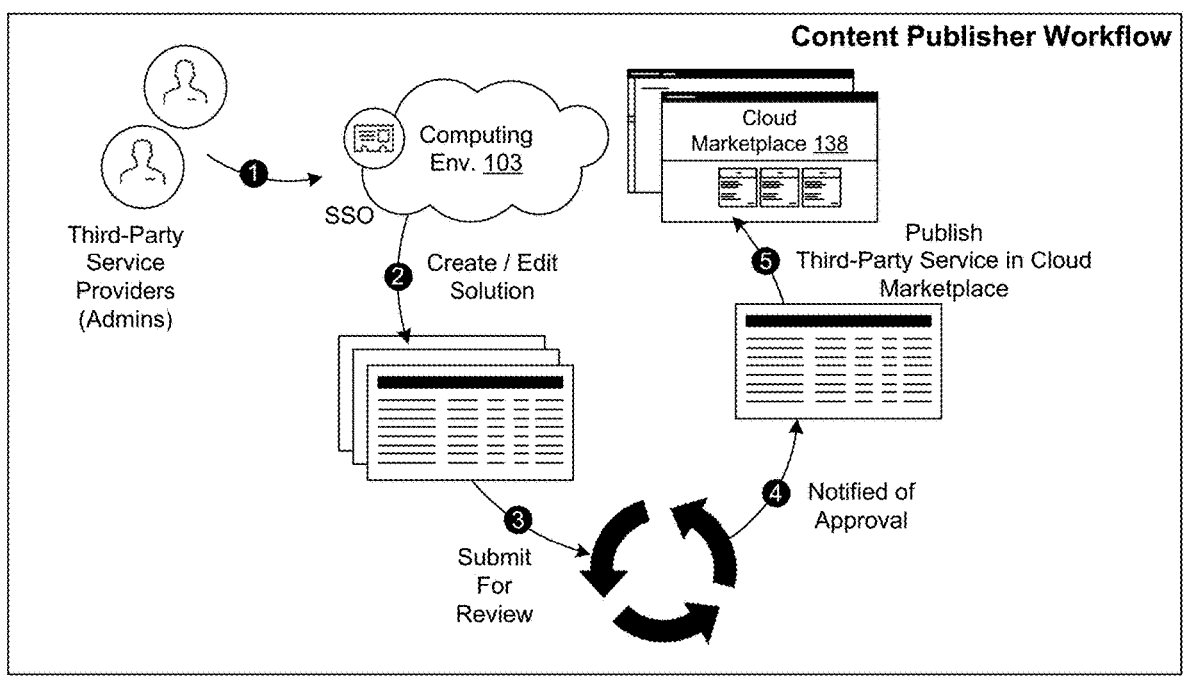
FIG. 9 is a sequence diagram illustrating an example workflow for a third-party service provider publish a third-party service in the cloud marketplace of FIG. 1.

Turning now to FIG. 9, a sequence diagram 815 is shown according to various examples. The sequence diagram 815 of FIG. 9 includes an example workflow for a third-party developer to publish or otherwise make a third-party service 110 available in the cloud marketplace 138. For instance, an enterprise, AlphaCo, can offer computing services 113, such as virtualization services, SDDC services, as well as other services. The enterprise, AlphaCo, can provide a cloud marketplace 138 to allow other enterprises, such as DeltaCo and ZetaCo, to publish their services on the cloud marketplace 138. The third-party services 110 offered by DeltaCo and ZetaCo, the third-party service providers, can be used by administrators in conjunction with the computing services 113 offered by AlphaCo.

To publish third-party services 110 and other content in the cloud marketplace 138, first, the third-party service providers can authenticate, DeltaCo and ZetaCo, with the computing environment 103, for example, by interacting with an SSO service. In alternative examples, the third-party service providers can authenticate by providing authentication credentials, biometric information, or otherwise authenticating using a client device 109.

Second, the computing environment 103 can provide an administrator portal (also referred to as a developer portal) that permits the third-party service provider to create or edit information regarding a third-party service 110 to be offered through the cloud marketplace 138. The information can include, for example, service metadata 132, compatibility data 133, template data 136, as well as other data. In some examples, the third-party service provider can edit various fields in the administrator portal, such as an icon, a description of the third-party service 110, screen shots of the third-party service 110 (or portals associated therewith), various features or benefits of the third-party service 110, support statements, as well as other information.

Further, in some examples, the computing environment 103 can permit the third-party service provider to specify whether the third-party service 110 should be hosted by the third-party service provider or by an entity that operates the cloud marketplace 138. Referring to the example above, if AlphaCo offers computing services 113 and the cloud marketplace 138, the computing environment 103 can permit the third-party service provider, such as DeltaCo, to specify whether the third-party service 110 is to be hosted by AlphaCo or DeltaCo.

In instances in which AlphaCo has been selected to host the third-party service 110, the computing environment 103 can collect export compliance information or other legal information. In some examples, based on the information provided by the third-party service provider, the computing environment 103 can identify computing services 113 compatible with the third-party service 110, or can rely on the compatibility data 133 specified by the third-party service provider.

Depending on a type of the third-party service 110, the cloud marketplace 138 can obtain additional information regarding the third-party service 110 using one or more additional user interfaces 160. For instance, if a third-party service provider specifies that a cloud computing service will be used in association with the third-party service 110, the cloud marketplace 138 can obtain additional information to deploy the third-party service 110 with the cloud computing service, such as an open virtualization appliance (OVA) file, a cloud creation template, configuration parameters, deployment scripts, as well as other information.

In some examples, an OVA file can include an archive file having one or more open virtualization format (OVF) package files. Further, in some examples, the computing environment 103 can require the third-party service provider to provide one more OVA or OVF files that include virtual appliances that can be executed to perform an automated deployment of the third-party service 110 of the third-party service provider, as will be discussed.

Third, after the third-party service provider provides sufficient information associated with the third-party service 110, the third-party service provider can submit the third-party service 110 for review. In some examples, the computing environment 103 can review the information automatically to determine whether to include the third-party service 110 in the cloud marketplace 138. In alternative examples, an administrator of the cloud marketplace 138 can inspect the information manually and determine, based on a review of the information, whether to include the third-party service 110 in the cloud marketplace 138.

Fourth, the third-party service provider can be notified of approval. To this end, the computing environment 103 can send an email, text message, or other suitable notification to the third-party service provider indicating that the third-party service 110 has been approved for access in the cloud marketplace 138.

Fifth, the computing environment 103 can publish the third-party service 110 in the cloud marketplace 138. As can be appreciated, when the cloud marketplace 138 is accessed by various administrators, the third-party service 110 can be shown if the third-party service 110 is compatible with computing services 113 or other infrastructure used by the administrators. Thereafter, the workflow can proceed to completion.

Figure 10:
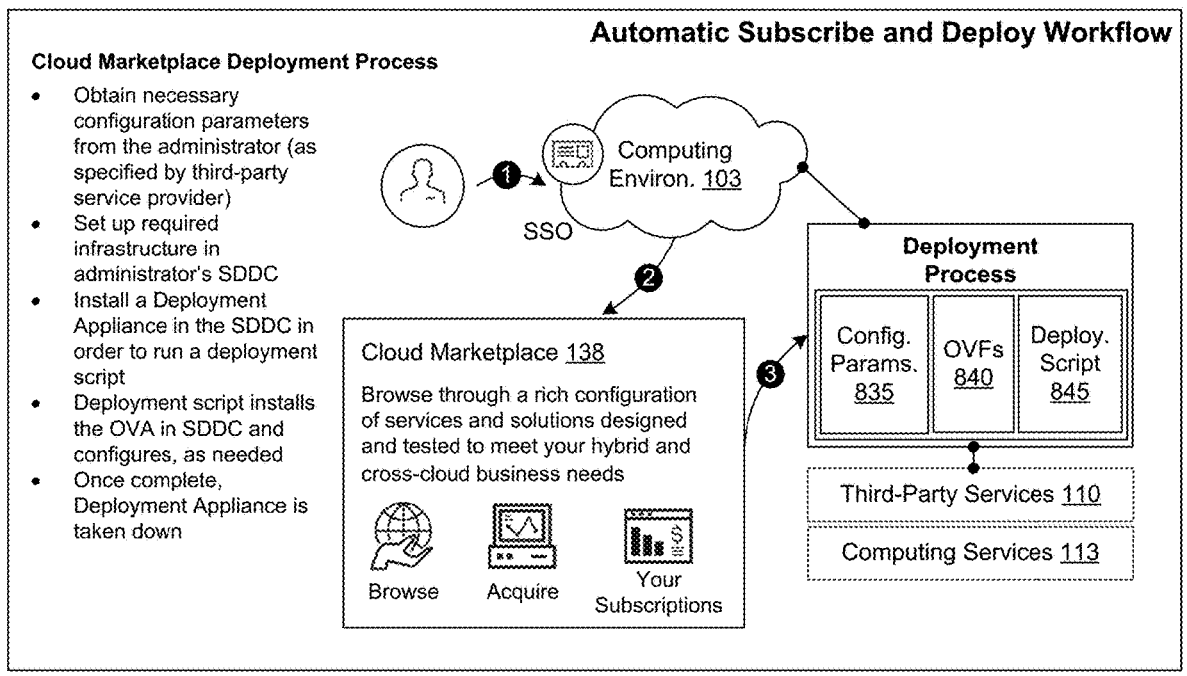
FIG. 10 is a sequence diagram illustrating an example workflow for performing an automatic subscribe and deploy process for a third-party service that interacts with infrastructure of the networked computing environment of FIG. 1.

Referring next to FIG. 10, another sequence diagram 830 is shown according to various examples. The sequence diagram 830 of FIG. 10 includes an example workflow for an end user to automatically subscribe to and deploy a third-party service 110. The workflow shown in FIG. 10 can be used to allow an end user, such as an enterprise administrator, to browse available third-party services 110, acquire the third-party services 110, and automatically deploy the third-party services 110 on computing services 113 used by the enterprise.

For instance, an enterprise, AlphaCo, can offer computing services 113 as well as a cloud marketplace 138 for the selection of third-party services 110 that interact with the computing services 113 offered by AlphaCo. A second enterprise, BetaCo, can utilize computing services 113 of AlphaCo to conduct enterprise operations. In one example, BetaCo can rent or otherwise subscribe to SDDC services provided by AlphaCo. BetaCo can further use the cloud marketplace 138 to access third-party services 110 that interact with the SDDC services offered by AlphaCo, such as security-related services.

First, an end user, such as an administrator for BetaCo, can authenticate with the computing environment 103, for example, by interacting with an SSO service. In alternative examples, the end user can authenticate by providing authentication credentials, biometric information, or otherwise authenticating using a client device 109. In some examples, the computing environment 103 can authenticate the credentials as a condition of accessing the cloud marketplace 138.

Second, the end user can interact with the cloud marketplace 138 to select one or more third-party services 110 for subscription and/or deployment. For instance, the end user can interact with the user interfaces 160 of one or more of FIGS. 2-7 to select, subscribe to, and deploy a third-party service 110.

Third, in response to the end user selecting a third-party service 110 for deployment, the computing environment 103 can perform a deployment process to add the third-party service 110 to an account of the end user as well and integrate the third-party service 110 with computing services 113 used by the end user. In one example, an administrator for an enterprise can access the cloud marketplace 138 through a network site or a dedicated client application. Based on the authentication, the computing environment 103 can provide the administrator with a listing of third-party services 110 compatible with SDDCs or other computing services 113 utilized by the enterprise.

Once the administrator has browsed the cloud marketplace 138 and selected one or more third-party services 110, the computing environment 103 can prompt the administrator to select the SDDC that is the intended target of the third-party service 110. Additionally, the computing environment 103 can prompt the administrator to enter various credentials to be used in the deployment process. Once the credentials have been validated, the computing environment 103 can present the administrator with a wizard or other ingestion process that collects the necessary configuration parameters 835 for deployment. The configuration parameters 835 can be defined by the third-party service provider as parameters required to successfully subscribe to and deploy the third-party service 110.

In some examples, the configuration parameters 835 required to be collected from the administrator can be defined by the cloud marketplace 138 or by the third-party service 110. For instance, the computing environment 103 can extract configuration parameters 835 from one or more OVF files uploaded by the third-party service provider. Further, the wizard can present the administrator with one or more user interfaces 160 that permits the administrator to launch and execute a pre-configured template in their cloud computing environment, virtualization environment, or other environment that will create the necessary resources for the third-party service 110.

Additionally, the computing environment 103 can perform the deployment process using OVF files 840, deployment scripts 845, and other information specified by the third-party service provider to automatically subscribe and deploy the third-party service 110. The OVF files 840, deployment scripts 845, and configuration parameters 830 can be provided by the third-party service provider during the content publication workflow, described in FIG. 9.

The computing environment 103 can use the OVF files 840 to set up required infrastructure in a SDDC or other computing services 133 of the end user. For instance, the computing environment 103 can use the OVF files 840 to install a deployment appliance in the SDDC of the end user, which can be used run a deployment script 845. In some examples, the deployment appliance can include a virtual machine 126. Further, in various examples, the deployment script 845 can include code or other program instructions that direct the computing environment 103 to install the OVF files 840 in a SDDC and configure the SDDC as needed to deploy the third-party service 110. Thereafter, the deployment appliance can be taken down. In other words, execution of the deployment appliance can be terminated. Thereafter, the computing services 113 can integrate and interact with the third-party services 110.

In some examples, the computing environment 103 can provides a webhook or a callback API to accept outputs or other data provided by third-party services 110 that require configuration to successfully deploy the third-party services 110. For instance, deploying a security service can require configuring a virtualization service offered by AlphaCo and configuring a cloud computing service offered by BetaCo. Once configured, the virtualization service and the cloud computing service can provide parameters through the webhook or the callback API.

Moving on to FIG. 11, a flowchart is shown that provides one example of the operation of a portion of the networked environment 100. The flowchart of FIG. 11 can be viewed as depicting an example of elements of a method implemented by the computing environment management service 140 executing in the computing environment 103 according to one or more examples. The separation or segmentation of functionality as discussed herein is presented for illustrative purposes only.

In step 903, the computing environment 103 can provide a portal, such as a developer portal, that receives an upload or a specification of a third-party service 110. For instance, if the computing services 113 offered through the computing environment 103 include cloud computing services, it is understood that various applications or services exist that may be beneficial to integrate with the cloud computing services. In one example, a backup and recovery service could be beneficial to integrate with a public or private cloud computing service. As such, a third-party service provider that oversees the backup and recovery service can access a developer portal offered by the provider of the cloud computing services. Through the developer portal, the third-party service provider can make its security service available for access through the cloud marketplace 138.

In step 906, the computing environment 103 can receive a specification of a third-party service 110. For instance, to make a third-party service 110 available in the cloud marketplace 138, in some examples, the developer portal receives service metadata 132, compatibility data 134, template data 136, or other data. In some examples, the developer portal can receive an upload of a compressed or packaged collection of files that can be accessed by the computing environment 103.

In step 909, the computing environment 103 can verify the third-party service 110 specified in step 906. In some examples, the computing environment 103 can verify the third-party service 110 based on the service metadata 132, compatibility data 134, template data 136, or other data pertaining to the third-party service 110. The computing environment 103 can perform an automatic inspection, for instance, to determine whether the compatibility data 134 indicates that the third-party service 110 is available for a vast number of computing services 113.

Alternatively, an administrator of the computing environment 103 can manually inspect the third-party service 110, or data associated therewith, to determine whether to verify the third-party service 110. In some examples, the computing environment 103 only includes third-party services 110 that have been verified for inclusion in the cloud marketplace 138. In other examples, the computing environment 103 only includes third-party services 110 that are published by a trusted publisher for inclusion in the cloud marketplace 138. Thereafter, the process can proceed to completion.

Figure 12:
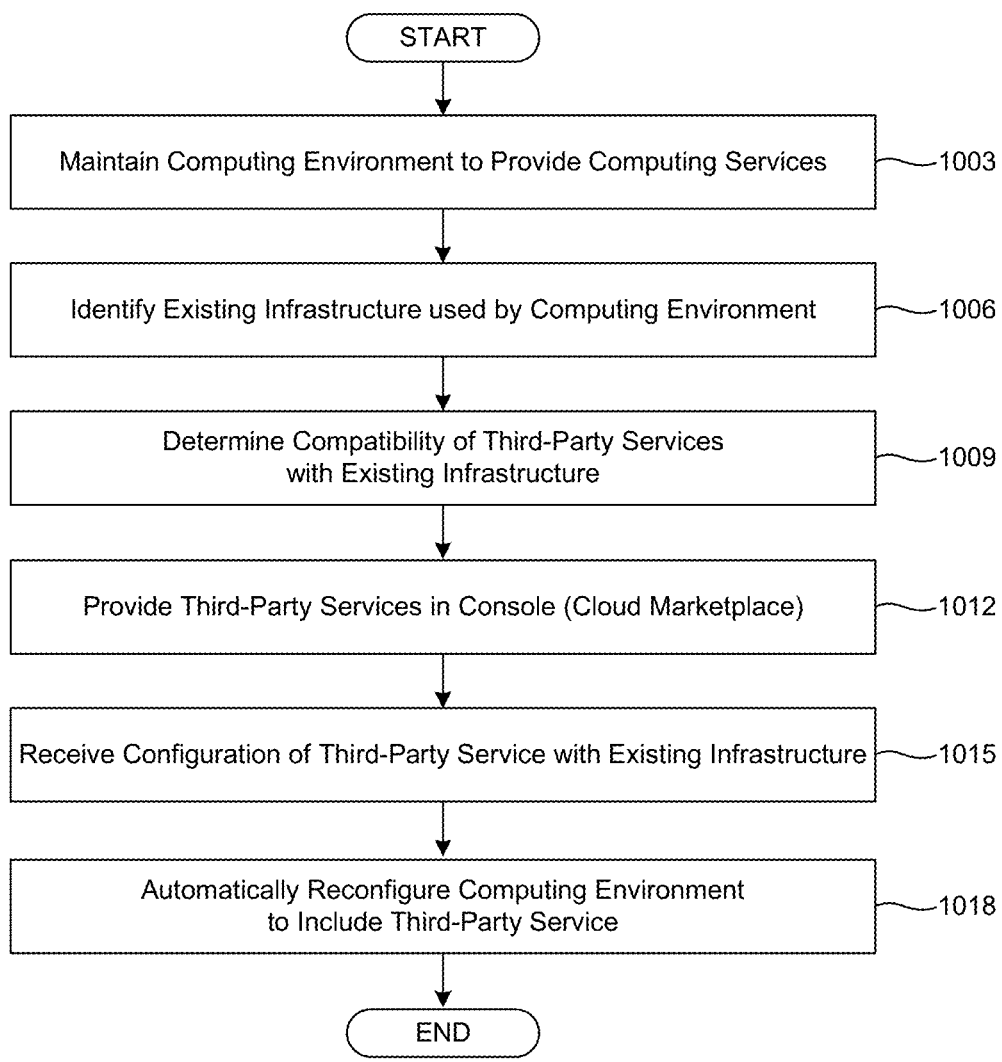
FIG. 12 is a flowchart illustrating functionality implemented by components of the networked computing environment of FIG. 1.

Turning now to FIG. 12, a flowchart is shown that provides one example of the operation of a portion of the networked environment 100. The flowchart of FIG. 12 can be viewed as depicting an example of elements of a method implemented by the computing environment management service 140 executing in the computing environment 103 according to one or more examples. FIG. 12 depicts an example of providing a cloud marketplace 138 for administrators or other users that allows an administrator to quickly integrate a third-party service 110 with an existing computing service 113. The separation or segmentation of functionality as discussed herein is presented for illustrative purposes only.

In step 1003, the computing environment management service 140 can maintain a remote computing environment 103 for an enterprise that provides one or more computing services 113 on behalf of the enterprise. In some examples, the computing services 113 can include remote computing services 133, such as virtual desktop infrastructure services, cloud computing services, web services, or other network-based services. To this end, in some examples, an enterprise can use the computing services 113 to provide a public cloud computing environment or a private cloud computing environment for use by employees or other individuals.

Traditionally, to integrate a third-party service 110 published by a service provider different than the computing environment 103, a developer would be required to gain an intricate understanding of the third-party service 110 and the computing services 113 provided by the computing environment 103. This can include, for instance, learning API calls for each respective service, translating API calls from one service to another, creating intermediate web services, formatting data in a manner interpretable by a respective one of the services, and similar tasks.

To facilitate the integration of third-party services 110 with the computing services 113 provided by the computing environment 103, the computing environment 103 can include a cloud marketplace 138. The cloud marketplace 138 can include a platform that enables third-party service providers to offer their third-party services 110 with the services 113 of the computing environment 103. For instance, the third-party service provider can provide service metadata 132, compatibility data 134, template data 136, as well as other data, which can be used to present third-party services 110 to users of the cloud marketplace 138 and to integrate the third-party services 110 with existing computing services 113.

In step 1006, the computing environment management service 140 can identify existing infrastructure used by the computing environment 103, for instance, in providing the one or more computing services 113 used by the enterprise. For example, if the computing services 113 provide cloud computing services for an enterprise, the infrastructure used in providing the cloud computing services can include servers, networking cards, CPUs, GPUs, as well as software used to invoke the cloud computing services. The computing environment 103 can use the existing infrastructure identified in step 1006 to determine which third-party services 110 to present to various users based on the computing services 133 used.

As such, in step 1009, the computing environment management service 140 can determine the compatibility of third-party services 110 with the existing infrastructure identified in step 1006. In one example, a third-party service provider can specify that a third-party service 110 requires a particular version of Apache® to be used by the computing services 113. The computing environment 103 can determine whether the computing services 113 used by the enterprise include the particular version of Apache®. As such, the computing environment 103 can identify one or more of the third-party services 110 that are compatible with the existing infrastructure used in providing the computing services 113. In some examples, the third-party services 110 are identified as being compatible based at least in part on the compatibility criteria 134 stored in a data store 131.

Next, in step 1012, the computing environment management service 140 can provide the third-party services 110 in a console in association with operation of the computing environment 103. The console can include the cloud marketplace 138 in some examples, as shown in FIG. 2. For instance, the cloud marketplace 138 can include one or more user interfaces 160 that have a listing of the third-party services 110 compatible with the existing infrastructure identified in step 1006 and step 1009.

In step 1015, the computing environment management service 140 can receive a configuration of a third-party service 110 with the existing infrastructure. For instance, the computing environment management service 140 can identify that a user of the cloud marketplace 138 has selected one or more of the third-party services 110 in the user interface 160 of FIG. 2 and performed the ingestion process whereby configuration settings have been specified by the user.

Thereafter, in step 1018, the computing environment management service 140 can automatically reconfigure the computing environment 103 to include the third-party service 110, or can otherwise integrate the third-party service 110 with the computing environment 103 and the computing services 113. In other words, in an instance in which one of the third-party services 110 is selected for deployment in the cloud marketplace 138, the computing environment management service 140 can automatically reconfigure the computing environment 103 to include the one of the third-party services 110 selected.

In some examples, the computing environment management service 140 can automatically reconfigure the computing environment 103 by directing one or more of the computing services 113 to interact with the third-party service 110 through an API or other communication medium of the third-party service 110. Additionally, the computing environment management service 140 can include the third-party service 110 in the cloud marketplace 138 as an existing service or solution and can permit the administrator to further configure the third-party service 110 in the cloud marketplace 138 or other suitable portal. Thereafter, the process can proceed to completion.

Figure 13:
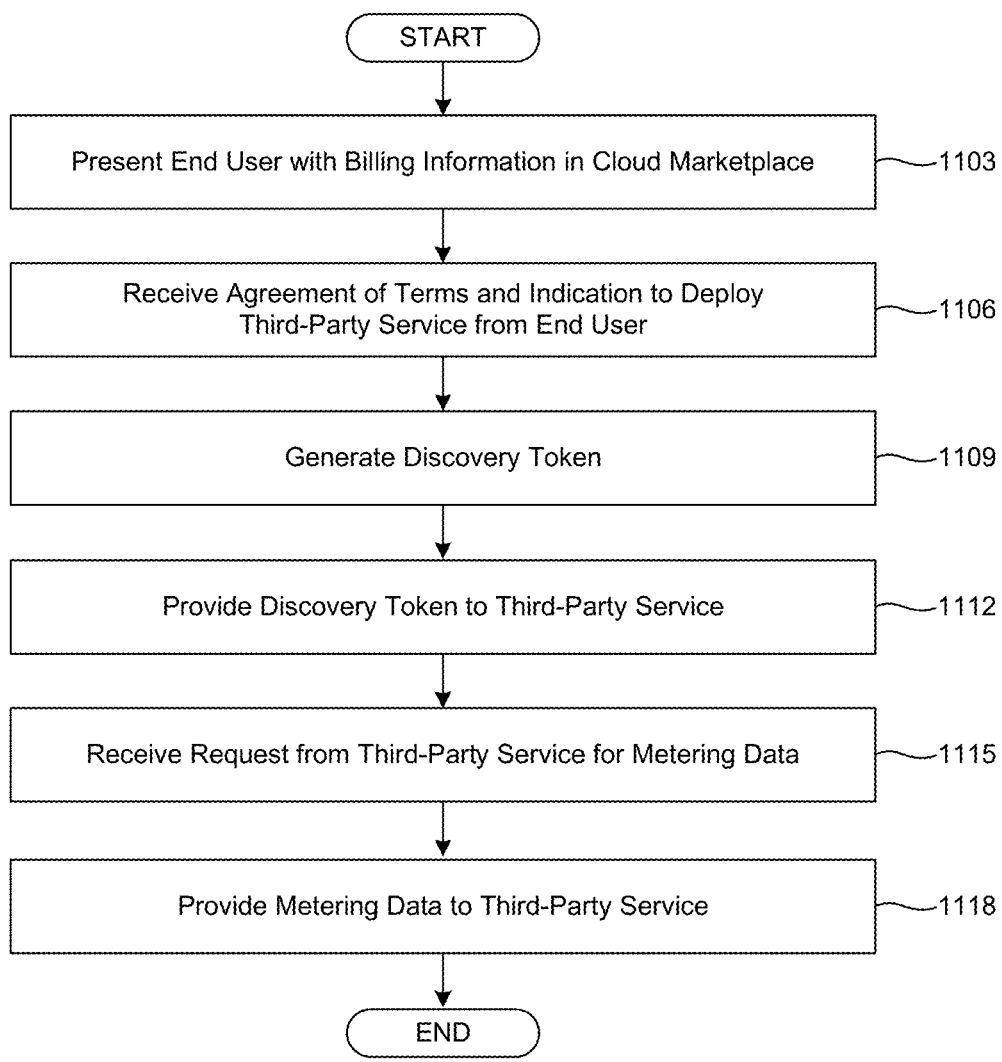
FIG. 13 is a flowchart illustrating functionality implemented by components of the networked computing environment of FIG. 1 when providing data usage information pertaining the use of a third-party service.

Referring next to FIG. 13, a flowchart is shown that provides one example of the operation of a portion of the networked environment 100. The flowchart of FIG. 13 can be viewed as depicting an example of elements of a method implemented by the cloud marketplace 138 executing in the computing environment 103 according to one or more examples. The separation or segmentation of functionality as discussed herein is presented for illustrative purposes only.

In some situations, third-party service providers can provide third-party services 110 in the cloud marketplace 138 that are usage or consumption based. In other words, a third-party service provider may desire to bill an enterprise or other user based on an amount of usage of the third-party service 110 in a given period of time. As such, it can be beneficial for the computing environment 103 and/or the cloud marketplace 138 to perform consumption-based or metered billing tasks. In some examples, the computing environment 103 and/or the cloud marketplace 138 can provide a data usage API (also referred to as a metering API) that permits third-party service providers to identify an amount of usage of a third-party service 110 by one or more end users.

In some examples, when a third-party service provider publishes a third-party service 110 in the cloud marketplace 138, the third-party service provider can specify that it desires to use metered billing. To this end, in some examples, the computing environment 103 can receive a specification of a metering type, a unit, and a cost per unit in a currency, such as dollars. The metering type can include subscriptions based on an amount of users, hosts, virtual machines, requests sent or received, data storage used, or other metering type. The unit can include users per hour; hosts per hour; virtual machines per hour; megabytes, gigabytes, or terabytes of data storage used; requests per hour; or other unit.

Further, in some examples, if a third-party service provider is publishing a third-party service 110 in the cloud marketplace 138, the computing environment 103 can require the third-party service provider to provide a registration URL associated with the third-party service. The cloud marketplace 138 can use the registration URL to send a request to the registration URL in the event that an end user starts a deployment process where the end user intends to purchase or deploy the third-party service 110. Additionally, the cloud marketplace 138 can assist the third-party service provider with generating various keys, such as a private key, a shared secret or secret key, a discovery API endpoint, or other information.

In some examples, the cloud marketplace 138 can host the discovery API endpoint. As such, the cloud marketplace 138 and the third-party service 110 can use the private key, the shared secret, as well as other information to request and send metering and subscription data from a data usage API. It is understood that, in some examples, the third-party service 110 can request the metering and subscription data through the discovery API endpoint.

Accordingly, beginning with step 1103, the cloud marketplace 138 can present an end user with billing information in the cloud marketplace 1103. The billing information can include the terms of billing, the metering type, the metering unit, costs per unit, as well as other information. In some examples, the cloud marketplace 138 can provide billing information associated with a third-party service 110 in a general information page for the third-party service 110. Alternatively, the cloud marketplace 138 can provide the billing information associated with a third-party service 110 to an end user in a wizard in the event the end user selects the third-party service 110 for deployment.

In step 1106, the cloud marketplace 138 can receive an agreement of terms and an indication to deploy a third-party service 110 from the end user. For instance, the cloud marketplace 138 can provide a user interface 160 that requires the end user to agree to various billing or metering terms, which can require the end user to review and agree to the terms in order to select the third-party service 110 for deployment.

Thereafter, in step 1109, the cloud marketplace 138 can generate a discovery token. In some examples, the discovery token includes a unique discovery token generated for a single use that expires after a predetermined number of hours or days. The cloud marketplace 138 can generate the discovery token to permit the third-party service 110 to conduct secure communications with the cloud marketplace 138, for instance, when the end user has selected the third-party service 110 for deployment.

As such, in step 1112, the cloud marketplace 138 can provide the discovery token generated in step 1109 to the third-party service 110. In some examples, the cloud marketplace 138 can communicate the discovery token to the discovery API endpoint specified by a third-party service provider when publishing the third-party service 110 in the cloud marketplace 138.

In step 1115, the cloud marketplace 138 can receive a request from the third-party service 110, or other service associated therewith, for metering data. In some examples, the third-party service 110 can call the data usage API once per hour, or at any other suitable time interval, to obtain data usage information from the cloud marketplace 138. After receipt of the discovery token, in some examples, the third-party service 110 can generate an encrypted key pair comprising a private key and a public key. The third-party service 110 can call the discovery API endpoint with the discovery token and the encrypted key pair.

In additional examples, the third-party service 110 can call the data usage API using a request that includes a subscription universally unique identifier (UUID), a metering unit quantity, a timestamp, and a signature. In some examples, the signature can include an encrypted payload generated by encrypting various information included in the request.

In step 1118, in an instance in which a request is received from the third-party service 110, the cloud marketplace 138 can provide metering data to the third-party service 110. In some examples, the cloud marketplace 138 can provide one or more data communications that include relevant end user information, a data usage API endpoint, a subscription status endpoint, a product code, a subscription universally unique identifier (UUID), the shared secret, as well as other information. After expiration of the discovery token, the cloud marketplace 138 can require all subsequent API calls to the data usage API to pass a JSON web token (JWT) signature using the private key in the HTTP header of the request. The cloud marketplace 138 can use the public key generated by the third-party service provider to verify the token signature. Thereafter, the process can proceed to completion.

Stored in the memory device are both data and several components that are executable by the processor. Also stored in the memory can be a data store 131 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 109 can be used to access user interfaces generated to configure or otherwise interact with the computing environment management service 140. These client devices 109 can include a display upon which a user interface generated by a client application for providing a virtual desktop session (or other session) can be rendered. In some examples, the user interface can be generated using user interface data provided by the computing environment 103. The client device 109 can also include one or more input/output devices that can include, for example, a capacitive touchscreen or other type of touch input device, fingerprint reader, or keyboard.

Although the computing environment management service 140, the computing services 113, the cloud marketplace 138, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for configuring infrastructure of a remote computing environment, comprising:
   at least one computing device;
   program instructions stored in memory and executable in the at least one computing device that, when executed by the at least one computing device, direct the at least one computing device to:
   maintain a remote computing environment for an enterprise that provides at least one remote computing service on behalf of the enterprise;
   identify existing infrastructure used by the remote computing environment in providing the at least one remote computing service;
   identify a plurality of third-party services that are compatible with the existing infrastructure;
   present the plurality of third-party services in a console in association with operation of the remote computing environment; and
   in an instance in which one of the third-party services is selected for deployment in the console, automatically reconfigure the remote computing environment to include the one of the third-party services selected.

2. The system of claim 1, wherein the remote computing environment is used to provide at least one of: an on-premise computing environment, a public cloud environment; a private cloud environment; a hybrid cloud environment; and a virtual desktop environment.

3. The system of claim 1, wherein the third-party services are identified as being compatible based at least in part on compatibility criteria stored in a data store.

4. The system of claim 1, wherein the at least one computing device is further directed to:
   provide a portal comprising at least one user interface configured to, from an entity not associated with the remote computing environment, receive a specification of:
   information associated with the one of the third-party services; and
   compatibility criteria of the one of the third-party services describing a compatibility of the one of the third-party services with infrastructure used by the remote computing environment.

5. The system of claim 1, wherein the existing infrastructure comprises at least one of: hardware of a data center utilized in providing the at least one remote computing service and software of the data center utilized in providing the at least one remote computing service.

6. The system of claim 1, wherein the at least one computing device is further directed to perform an ingestion process comprising presenting at least one user interface for configuration of the third-party services in association with the existing infrastructure.

7. The system of claim 6, wherein at least a portion of the ingestion process comprises navigating to a third-party network page associated with the third-party service, wherein at least one field of the third-party network page is prepopulated based at least in part on a setting received in the ingestion process prior to a navigation to the third-party network page.

8. A non-transitory computer-readable medium for configuring infrastructure of a remote computing environment, comprising program code executable in at least one computing device that, when executed by the at least one computing device, directs the at least one computing device to:
 maintain a remote computing environment for an enterprise that provides at least one remote computing service on behalf of the enterprise;
 identify existing infrastructure used by the remote computing environment in providing the at least one remote computing service;
 identify a plurality of third-party services that are compatible with the existing infrastructure;
 present the plurality of third-party services in a console in association with operation of the remote computing environment; and
 in an instance in which one of the third-party services is selected for deployment in the console, automatically reconfigure the remote computing environment to include the one of the third-party services selected.

9. The non-transitory computer-readable medium of claim 8, wherein the remote computing environment is used to provide at least one of: an on-premise computing environment, a public cloud environment; a private cloud environment; a hybrid cloud environment; and a virtual desktop environment.

10. The non-transitory computer-readable medium of claim 8, wherein the third-party services are identified as being compatible based at least in part on compatibility criteria stored in a data store.

11. The non-transitory computer-readable medium of claim 8, wherein the at least one computing device is further directed to:
 provide a portal comprising at least one user interface configured to, from an entity not associated with the remote computing environment, receive a specification of:
 information associated with the one of the third-party services; and
 compatibility criteria of the one of the third-party services describing a compatibility of the one of the third-party services with infrastructure used by the remote computing environment.

12. The non-transitory computer-readable medium of claim 8, wherein the existing infrastructure comprises at least one of: hardware of a data center utilized in providing the at least one remote computing service and software of the data center utilized in providing the at least one remote computing service.

13. The non-transitory computer-readable medium of claim 8, wherein the at least one computing device is further directed to perform an ingestion process comprising presenting at least one user interface for configuration of the third-party services in association with the existing infrastructure.

14. The non-transitory computer-readable medium of claim 13, wherein at least a portion of the ingestion process comprises navigating to a third-party network page associated with the third-party service, wherein at least one field of the third-party network page is prepopulated based at least in part on a setting received in the ingestion process prior to a navigation to the third-party network page.

15. A computer-implemented method for configuring infrastructure of a remote computing environment, comprising:
 maintaining a remote computing environment for an enterprise that provides at least one remote computing service on behalf of the enterprise;
 identifying existing infrastructure used by the remote computing environment in providing the at least one remote computing service;
 identifying a plurality of third-party services that are compatible with the existing infrastructure;
 presenting the plurality of third-party services in a console in association with operation of the remote computing environment; and
 in an instance in which one of the third-party services is selected for deployment in the console, automatically reconfiguring the remote computing environment to include the one of the third-party services selected.

16. The computer-implemented method of claim 15, wherein the remote computing environment is used to provide at least one of: an on-premise computing environment, a public cloud environment; a private cloud environment; a hybrid cloud environment; and a virtual desktop environment.

17. The computer-implemented method of claim 15, wherein the third-party services are identified as being compatible based at least in part on compatibility criteria stored in a data store.

18. The computer-implemented method of claim 15, further comprising:
 providing a portal comprising at least one user interface configured to, from an entity not associated with the remote computing environment, receive a specification of:
 information associated with the one of the third-party services; and
 compatibility criteria of the one of the third-party services describing a compatibility of the one of the third-party services with infrastructure used by the remote computing environment.

19. The computer-implemented method of claim 15, wherein the existing infrastructure comprises at least one of: hardware of a data center utilized in providing the at least one remote computing service and software of the data center utilized in providing the at least one remote computing service.

20. The computer-implemented method of claim 15, wherein the at least one computing device is further directed to:
 perform an ingestion process comprising presenting at least one user interface for configuration of the third-party services in association with the existing infrastructure, wherein at least a portion of the ingestion process comprises navigating to a third-party network page associated with the third-party service, wherein at least one field of the third-party network page is prepopulated based at least in part on a setting received in the ingestion process prior to a navigation to the third-party network page.

\* \* \* \* \*